(12) United States Patent
Lacey et al.

(10) Patent No.: US 6,587,240 B1
(45) Date of Patent: Jul. 1, 2003

(54) OPTICAL SWITCHING NODE AND METHOD FOR OPERATING SAME

(75) Inventors: Jonathan P. R. Lacey, Mountain View, CA (US); David G. Cunningham, Cupertino, CA (US); Steve Methley, Bristol (GB); Mark Nowell, Stittsville (CA)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/470,087

(22) Filed: Dec. 22, 1999

(30) Foreign Application Priority Data

Dec. 21, 1998 (JP) ............................................ 10-362809
Dec. 10, 1999 (JP) ............................................ 11-351576

(51) Int. Cl.[7] .................................................. H04B 10/08
(52) U.S. Cl. ....................... 359/128; 359/117; 359/138; 359/165; 359/177
(58) Field of Search ............................ 359/117, 128, 359/147, 177, 161, 138, 165

(56) References Cited

U.S. PATENT DOCUMENTS 5,303,077 A * 4/1994 Bottle et al. ................. 359/117
5,726,788 A * 3/1998 Fee et al. ..................... 359/118

* cited by examiner

Primary Examiner—Leslie Pascal

(57) ABSTRACT

An optical switching node and method for operating same is disclosed. If a signal received over an optical fiber is destined for the switching node at which the signal is received, the signal is processed conventionally. If there is a signal on the fiber that is destined for a different optical switching node, then a node controller will determine whether that signal requires equalization and/or regeneration. A network manager instructs the node controller whether the signal requires wavelength conversion. In accordance with the invention, if the optical signal on the fiber is destined for a different optical switching node and requires none of equalization, regeneration and wavelength conversion, the optical signal remains in the optical domain and is switched directly to an appropriate output fiber. If the node controller and network manager determine that the optical signal that is destined for a different optical switching node requires any combination of equalization, regeneration, and/or wavelength conversion, then the signal is further processed in the optical switching node to provide those functions.

13 Claims, 4 Drawing Sheets

OPTICAL SWITCHING NODE AND METHOD FOR OPERATING SAME

TECHNICAL FIELD

The invention relates generally to optical communication systems, and, more particularly, to an optical switching node and method for operating same.

BACKGROUND OF THE INVENTION

Optical communications systems are used throughout the world for carrying large amounts of data and voice transmissions. Optical communication systems generally employ fiber optic cables that carry optical signals from one location to another. Typically, many optical signals are carried on a single optical fiber by using wavelength-division multiplexing (WDM). Switching nodes are located along many optical communication paths and are typically connection points for a plurality of optical fibers. The switching nodes include optical and electrical switching equipment. If a particular optical signal on an optical fiber is destined for a particular switching node, the wavelength-multiplexed optical signals on the fiber are demultiplexed at that node into individual optical signals, the individual optical signals are converted by an optical receiver at the node to respective electrical signals, the electrical signal derived from the desired optical signal is switched electronically to its final destination, and a new optical signal is derived from the electrical signal.

In most optical communication networks, many of the optical signals entering a switching node merely pass through the node on the way to their final destination. These optical signals that are destined for a different switching node may require regeneration, equalization and/or wavelength conversion, or may be of the appropriate wavelength, have sufficient optical power and have sufficient signal quality to be communicated directly to the next switching node.

Regeneration is the process of determining whether each bit of the digital signal with which an optical signal is modulated is a binary "one" or a binary "zero," and using this information to create a new, noiseless, undistorted version of the modulated optical signal. Regeneration typically also includes retiring the modulation to reduce timing jitter. In existing optical communication systems, an optical signal is regenerated by converting the optical signal to an electrical signal, processing the electrical signal, and converting the processed electrical signal back to a noiseless, undistorted, jitter-free optical signal for retransmission.

Wavelength conversion involves changing the optical carrier wavelength of an optical signal, without altering the information modulated on the optical signal. Wavelength conversion typically also includes the above-mentioned regeneration process, which will be assumed for the remainder of this document.

Equalization is the process of adjusting the power of an optical signal so that all signals in a system are maintained at the same power level. Equalization is necessary in systems in which optical signals experience different gain or loss as they travel through the system, and is often necessary in WDM systems because of wavelength-dependent loss or gain. Equalization can be performed using a variable optical attenuator.

In existing optical communication systems, all optical signals received at a switching node are wavelength-demultiplexed, if necessary, converted from an optical signal to an electrical signal, and regenerated. Some advantages of such existing switching nodes are that wavelength conversion (which eases network management) and equalization are straightforward; and that electronic logic can be used to monitor the quality of the incoming signals so that upstream faults can be rapidly and precisely identified and compensated.

However, such existing switching nodes receive, demultiplex, regenerate and retransmit some signals that are destined for a different switching node and that do not require regeneration, equalization or wavelength conversion. Therefore, because existing switching nodes must contain sufficient resources to operate on all optical signals present at the switching node, such existing switching nodes contain more expensive resources (wavelength demultiplexers and multiplexers, receivers, transmitters, regeneration and monitoring logic) than might be necessary.

Therefore, it would be desirable to have a switching node that minimizes the amount of signal processing performed at the node such that only signals that require processing are processed by the node. Such a switching node would allow an optical signal that is destined for a different node and that requires no regeneration, equalization, wavelength conversion or interchange with other signals having the same wavelength to remain as an optical signal as it passes directly through the switching node. The cost of such a switching node could be less than the cost of an existing node having similar switching capacity because it could contain fewer wavelength demultiplexers and multiplexers, receivers, transmitters, regeneration and monitoring logic, etc.

SUMMARY OF THE INVENTION

The invention provides an optical switching node and method for operating same. In architecture, the invention may be considered an optical switching node comprising a fiber cross-connect that receives optical signals and a node controller in communication with the fiber cross-connect.

The node controller is configured to determine whether any of the optical signals are destined for a different optical switching node. The node controller is also configured to determine whether any of the optical signals destined for the different switching node require further processing. The optical switching node also includes a signal converter that operates in response to the node controller and converts to an electrical signal only those optical signals destined for the optical switching node and those optical signals destined for the different optical switching node that require further processing.

The invention can also be conceptualized as a method for operating an optical switching node. The method comprises the steps of determining whether any of the optical signals received at the optical switching node are destined for a different optical switching node and determining whether any of the optical signals destined for the different switching node require further processing. Only the optical signals determined to be destined for the optical switching node or to be destined for the different optical switching node and require further processing are converted to electrical signals.

The invention has numerous advantages, a few which are delineated below merely as examples.

An advantage of the invention is that it reduces the complexity of a switching node.

Another advantage of the invention is that it reduces the cost of an optical switching node.

Another advantage of the invention is that it allows the direct passage of an optical signal through a switching node.

Another advantage of the invention is that it reduces the amount of resources (wavelength demultiplexers and multiplexers, receivers, transmitters, regeneration and monitoring logic) that are necessary at an optical switching node.

Another advantage of the invention is that it is simple in design and easily implemented on a mass scale for commercial production.

Other features and advantages of the invention will become apparent to one with skill in the art upon examination of the following drawings and detailed description. These additional features and advantages are intended to be included herein within the scope of the invention.

BRIEF DESCRIPTION OF THE DRAWINGS

The invention, as defined in the claims, can be better understood with reference to the following drawings. The components within the drawings are not necessarily to scale relative to each other, emphasis instead being placed upon clearly illustrating the principles of the invention.

DETAILED DESCRIPTION OF THE PREFERRED EMBODIMENT

Figure 1:
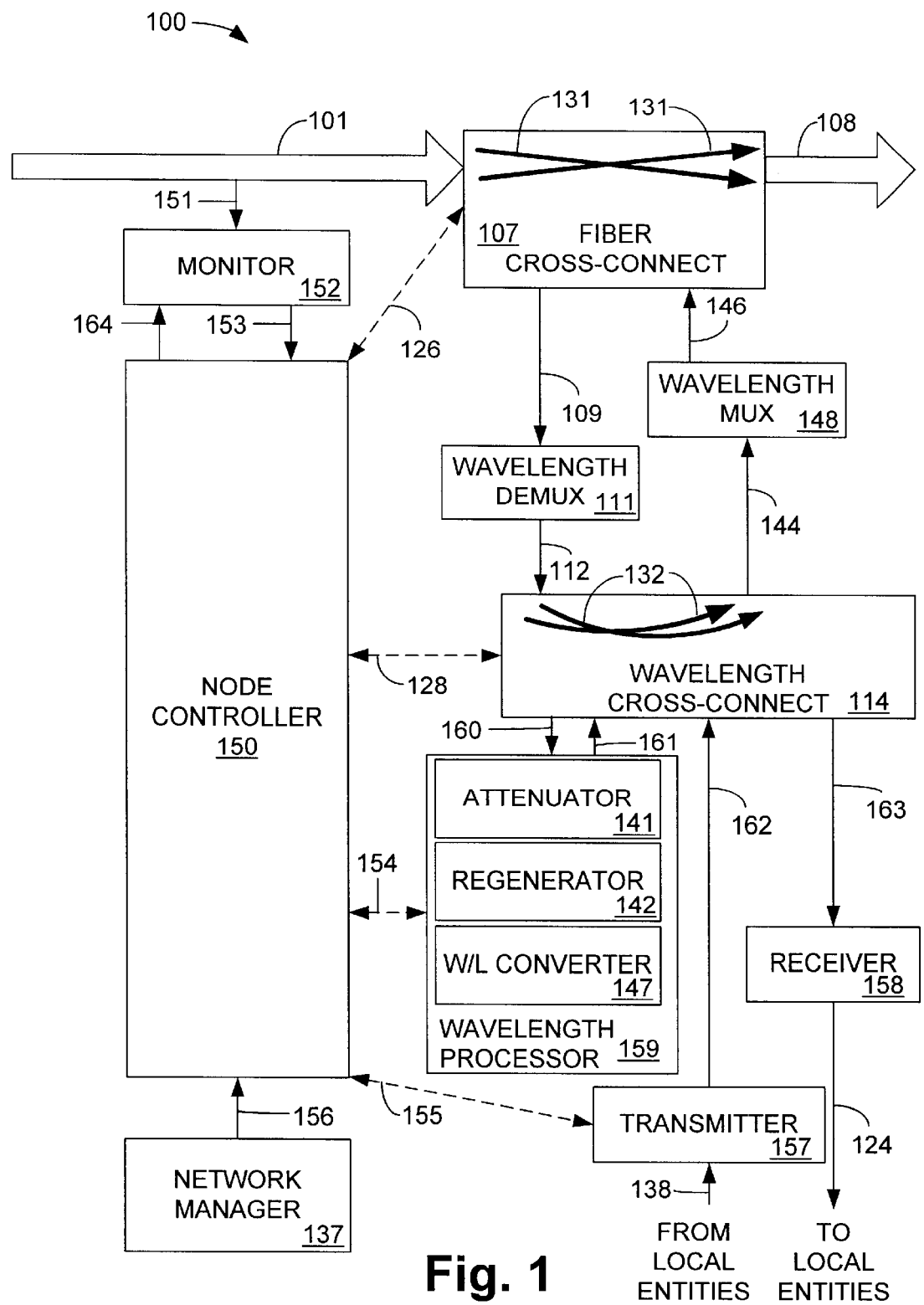
FIG. 1 is a block diagram illustrating an optical switching node constructed in accordance with the invention.

FIG. 1 is a block diagram illustrating an optical switching node 100 constructed in accordance with the invention. Optical switching node 100 includes at least one, and generally a plurality of optical fibers 101 that supply optical communication signals to fiber cross-connect 107. Optical fiber 101 may be a single optical fiber carrying a plurality of wavelength-multiplexed optical signals, or may include a plurality of optical fibers each carrying a plurality of wavelength-multiplexed optical signals. For the following discussion, it is assumed that optical fiber 101 represents a plurality of optical fibers each carrying wavelength-multiplexed optical signals. Fiber cross-connect 107 receives inputs from fiber 101 and via connection 146 from wavelength multiplexer 148; and provides outputs to fiber 108 and to wavelength demultiplexer 111 via connection 109. Fiber cross-connect 107 is typically a connection matrix that routes an input signal to an appropriate output. Optical fiber 108, connection 109, and connection 146, while described as single fibers or connections may include a plurality of optical fibers or connections similar to optical fiber 101.

Node controller 150 controls fiber cross-connect 107 via connection 126. Node controller 150 receives information from network manager 137 over connection 156 regarding which, if any, fibers 101 carry optical signals destined for optical switching node 100, and which fibers 101 carry optical signals destined for an optical switching node other than node 100. Node controller 150 is instructed by network manager 137 as to which, if any, of the fibers carrying only optical signals destined for a switching node other than node 100 carry optical signals that require wavelength conversion.

The network manager 137 also determines, via monitor 152 which, if any, of the fibers carrying only optical signals destined for a switching node other than node 100 carry optical signals that require regeneration or equalization. Node controller 150 is also instructed by network manager 137 which, if any, of the fibers carrying only optical signals destined for a switching node other than node 100 carry optical signals that are to exit the fiber cross-connect 107 on a single optical fiber, and which carry optical signals that are required to be interchanged with optical signals having the same wavelength on other optical fibers. Optical signals originating from a single fiber that are bound for a switching node other than switching node 100 and that require none of wavelength conversion, regeneration, equalization and interchange with optical signals having the same wavelength on other fibers are referred to as "express optical signal groups". Express optical signal groups are represented by arrows 131. Optical signals that require further processing are routed over connection 109 to wavelength demultiplexer 111.

The operation of monitor 152 and its interaction with node controller 150 will be described in further detail with respect to FIG. 2.

In accordance with the invention, if all the optical signals on an incoming fiber 101 are destined for a node other than node 100, and none requires regeneration, wavelength conversion, equalization, or interchange with signals on other fibers, that is, if the optical signals carried by fiber 101 constitute an express optical signal group, node controller 150 will configure fiber cross-connect 107 so that such optical signals will pass directly through fiber cross-connect 107 and out of switching node 100 over fiber 108. This occurs without conversion to an electrical signal and without wavelength demultiplexing. In this manner, any group of wavelength-multiplexed optical signals destined for an optical switching node other than optical switching node 100, and that do not require regeneration, wavelength conversion, equalization or interchange with signals on other fibers can be switched directly through optical switching node 100 to the destination node.

Wavelength cross-connect 114 receives input from wavelength demultiplexer 111 via connection 112, from transmitter 157 via connection 162, and from wavelength processor 159 via connection 161. Wavelength cross-connect 114 includes outputs to wavelength multiplexer 148 via connection 144, to receiver 158 via connection 163, and to wavelength processor 159 via connection 160.

Wavelength cross-connect 114 is typically an optical connection matrix that routes the input optical signals to appropriate outputs. It is assumed herein that all switching performed by wavelength cross-connect 114 is performed on optical signals. Alternatively, there may be applications in which wavelength cross-connect 114 performs wavelength switching electrically. For example, wavelength cross-connect 114 may be implemented having receivers similar to receiver 158 (to be described below) on its input ports (connection 112), the receivers used to convert incoming optical signals to electronic signals, an electronic crossbar switching matrix (not shown) to interconnect electronic input ports to electronic output ports, and transmitters similar to transmitter 157 (to be described below) on its output ports (connection 144) to convert the switched electronic signals to optical signals. Connections 112, 144, 160, 161, 162 and 163, while described as single connections, may include a plurality of connections.

Node controller 150 controls wavelength cross-connect 114 via connection 128. Node controller 150 receives from network manager 137 over connection 156 information regarding which, if any, optical signals on connection 112 are destined for an optical switching node other than node 100 and require interchange with optical signals having the same wavelength on other fibers, but which do not require wavelength conversion or equalization. These optical signals are described as "express optical signals" and are indicated by arrows 132.

Optical signals on connection 112 that do not require interchange with optical signals having the same wavelength on other fibers are directed to either wavelength processor 159 via connection 160, or to receiver 158 via connection 163 and will be described below. Information regarding whether the optical signals require regeneration or equalization is provided to wavelength cross-connect 114 from monitor 152, through node controller 150. In accordance with the invention, node controller 150 will configure wavelength cross-connect 114 so that the optical signals that require none of wavelength conversion, equalization, and regeneration will pass directly through wavelength cross-connect 114 as express optical signals 132 and out to wavelength multiplexer 148 via connection 144 without being converted to electrical signals. In this manner, any optical signal destined for an optical switching node other than optical switching node 100, and that does not require regeneration, wavelength conversion, or equalization (i.e., an express optical signal) can be directly interchanged with an optical signal on another fiber and switched through optical switching node 100 to the destination node.

In accordance with the invention, if any optical signal on fiber 101 will terminate at optical switching node 100, then all of the optical signals on that fiber are sent over connection 109 from fiber cross-connect 107 to wavelength demultiplexer 111. Wavelength demultiplexer 111 demultiplexes all of the wavelength-multiplexed optical signals on that fiber and sends each demultiplexed optical signal over connection 112 to wavelength cross-connect 114. The wavelength cross-connect 114 selects the optical signals that will terminate at optical switching node 100 and routes those optical signals over connection 163 to receiver 158. The optical signals that terminate at switching node 100 are sometimes referred to as "dropped signals."

While shown as a single block, receiver 158 is typically a plurality of receivers. Receiver 158 receives the dropped optical signal over connection 163 from wavelength cross-connect 114 and converts the optical signal to an electrical signal. The electrical signal is then analyzed to determine whether each bit represents a binary 1 or a binary 0 value. Receiver 158 then creates a new, noiseless, undistorted, jitter-free version of that electrical signal for transmission over connection 124 to local entities that may include synchronous optical network/synchronous digital hierarchy (SONET/SDH) digital cross-connects, asynchronous transfer mode (ATM) switches, Internet protocol (IP) routers, etc.

In accordance with the invention, if any optical signal on fiber 101 requires regeneration, wavelength conversion or equalization, then all of the optical signals on that fiber are sent over connection 109 from fiber cross-connect 107 to wavelength demultiplexer 111. Wavelength demultiplexer 111 demultiplexes all of the wavelength-multiplexed optical signals on the fiber and sends each demultiplexed optical signal over connection 112 to wavelength cross-connect 114. The wavelength cross-connect 114 selects the optical signals that require regeneration, wavelength conversion or equalization and routes said optical signals over connection 160 to wavelength processor 159. While shown as a single block, wavelength processor 159 is typically a plurality of devices, including wavelength converter(s) 147, regenerator(s) 142 and variable optical attenuator(s) 141.

If the optical signal selected by the wavelength cross-connect 114 requires equalization, the variable optical attenuator 141 in wavelength processor 159 attenuates the optical signal to the desired value and sends the equalized optical signal back to wavelength cross-connect 114 via connection 161. If the selected optical signal requires regeneration, the regenerator 142 in wavelength processor 159 determines whether each bit represents a binary 1 or a binary 0 value, and then creates a new, noiseless, undistorted version of the optical signal at the same wavelength. The regenerated optical signal is sent back to optical wavelength cross-connect 114 via connection 161.

The regeneration process may or may not involve conversion of the optical signal to an electrical signal and back to an optical signal. If the optical signal to selected by the wavelength cross-connect 114 requires wavelength conversion, the wavelength converter 147 in wavelength processor 159 determines whether each bit represents a binary 1 or a binary 0 value, and then creates a new, noiseless, undistorted, jitter-free version of the optical signal at the desired wavelength. This wavelength-shifted, regenerated optical signal is sent back to optical wavelength cross-connect 114 via connection 161.

If a selected optical signal requires equalization and wavelength conversion or regeneration, the optical signal is switched by wavelength cross-connect 114 to wavelength processor 159 where one of these operations is performed. The signal is then sent back to wavelength cross-connect 114, and switched back to wavelength processor 159 for the second operation. The processing is performed in this manner because the implementation contemplated for the wavelength processor 159 is better suited to perform one operation each time the signal is passed through the processor. In this manner, the complexity of the wavelength processor 159 can be minimized because the need for communication between the wavelength processor and the node controller 150 regarding configuration of the wavelength processor is minimized. Alternatively, it is foreseeable that multiple operations could be performed in a single pass through the wavelength processor.

Equalized, wavelength-converted and/or regenerated optical signals entering wavelength cross-connect 114 via connection 161 are switched to wavelength multiplexer 148 via connection 144. The optical signals then enter fiber cross-connect 107 via connection 146, where they are switched to an appropriate output fiber 108.

Electrical information signals originating from local entities that are to be transmitted through optical switching node 100 and onto fiber 108 are received over connection 138 and supplied to transmitter 157. Transmitter 157 converts the electrical information signals into optical signals at the appropriate wavelength and supplies them over connection 162 to wavelength cross-connect 114. The wavelength cross-connect 114 sends the optical signals over connection 144 to wavelength multiplexer 148, where they are multiplexed and switched by the fiber cross-connect 107 onto an appropriate output fiber 108.

Node controller 150 communicates with wavelength cross-connect 114, wavelength processor 159 and transmitter 157 over connections 128, 154 and 155, respectively.

Figure 2:
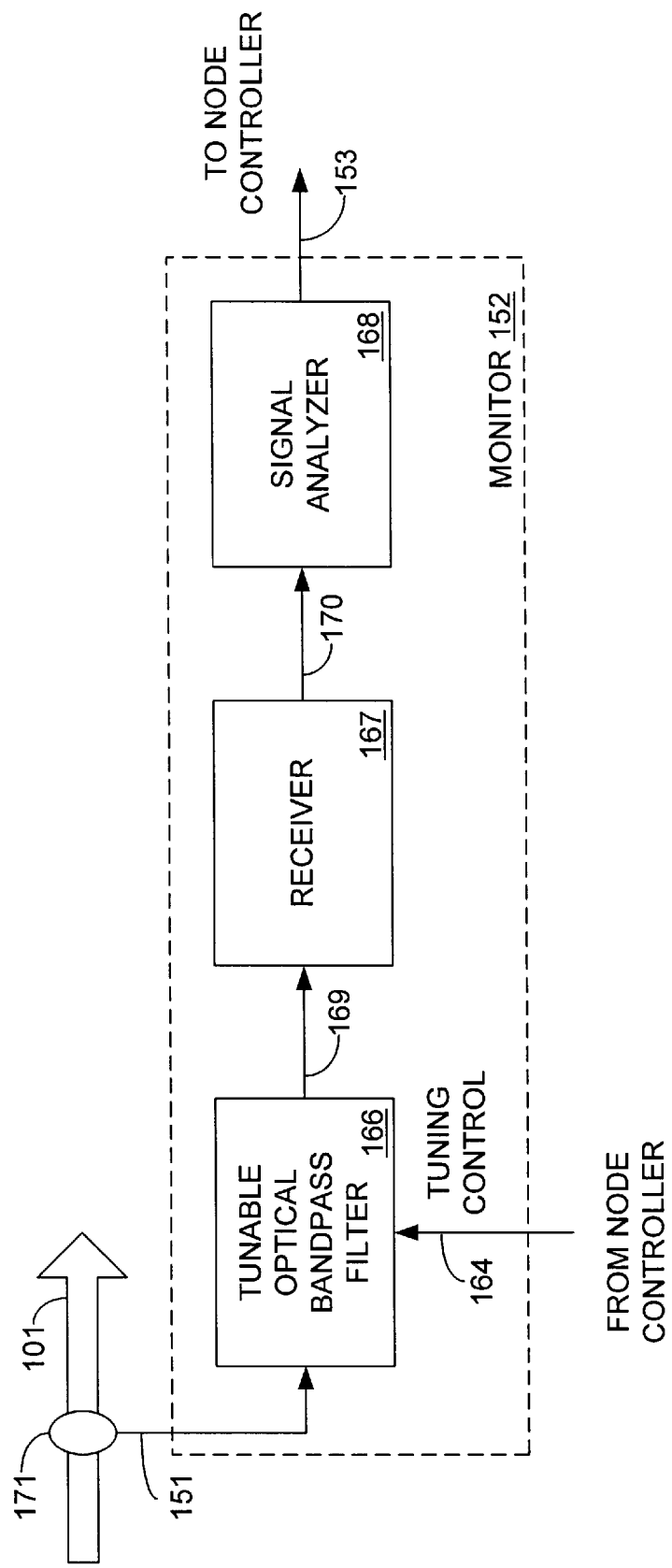
FIG. 2 is a block diagram illustrating the monitor of FIG. 1.

FIG. 2 is a block diagram illustrating the monitor 152 of FIG. 1. When commanded by the node controller 150 of FIG. 1, the monitor 152 analyzes the optical signal chosen by node controller 150, and determines whether this optical signal requires regeneration or equalization. Monitor 152 is connected to input fiber 101 via tap 171 and connection 151.

Tap 171 removes a small amount of light from fiber 107 and directs this light through connection 151 to tunable optical bandpass filter 166. Tunable optical bandpass filter 166 is tuned by a tuning control signal 164 received from node controller 150 over connection 164. The tuning control signal 164 may be represented by an electrical, optical, or a mechanical signal. Tuning control signal 164 directs tunable optical bandpass filter 166 to pass one of the optical signals present on connection 151 to receiver 167 via connection 169 and to block all others. Tuning control signal 164 originates in node controller 150, which determines the wavelength of the optical signal that is to be passed by filter 166, and thus which optical signal is analyzed. The single optical signal output from filter 166 passes to receiver 167 via connection 169, where it is converted to an electrical signal.

Receiver 167 is similar to receiver 158 described above. The electrical signal generated by the receiver 167 passes to signal analyzer 168 via connection 170. Signal analyzer 168 measures the electrical signal strength and determines the optical power therefrom. Signal analyzer 168 then estimates the bit-error-ratio of the signal, and sends this information to node controller 150 via connection 153.

The node controller 150 uses the bit-error ratio estimate to determine whether the selected optical signal requires regeneration. If the bit-error ratio estimate is worse than a predetermined threshold, then the optical signal requires regeneration. If the bit-error ratio estimate is better than the threshold, the optical signal is passed through the switching node without regeneration. Estimation of the bit-error ratio may occur using known techniques, such as, for example, measurement of optical signal-to-noise ratio; eye pattern estimation; or parity check.

Node controller 150 uses the optical power measurement supplied by signal analyzer 168 to determine whether the signal requires equalization. If the optical power does not fall within a predetermined range, then the signal requires equalization. If the optical power is within the specified range, the signal is passed through the switching node 100 without equalization.

Figure 3:
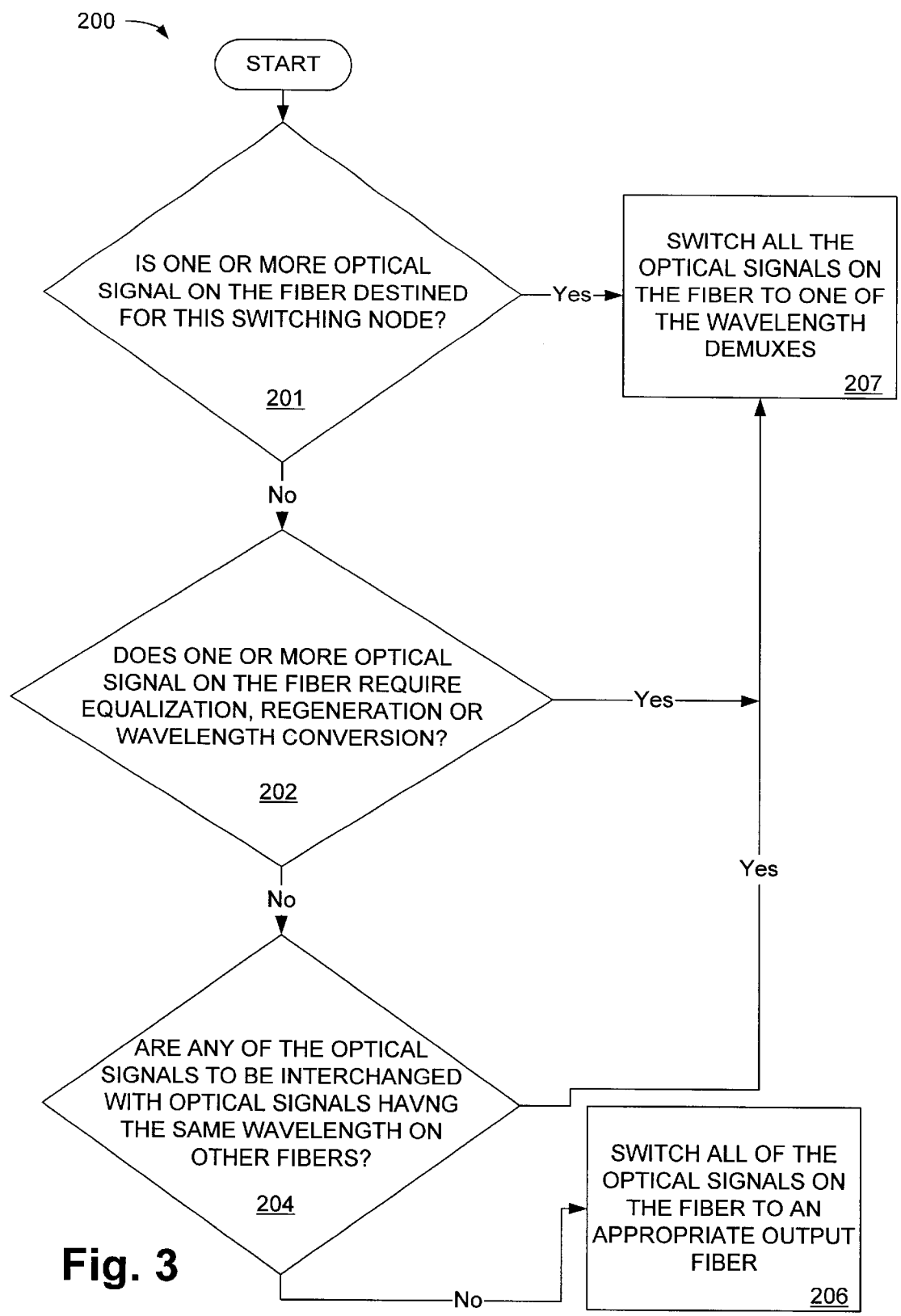
FIG. 3 is a flow chart illustrating the operation of the node controller of FIG. 1 while controlling the fiber cross-connect of FIG. 1.

FIG. 3 is a flow chart 200 illustrating the operation of the node controller 150 while controlling the operation of the fiber cross-connect 114 of FIG. 1. In block 201 it is determined whether one or more optical signals on fiber 101 (FIG. 1) are destined for switching node 100 of FIG. 1. Network manager 137 of FIG. 1 supplies this information. If one or more of the optical signals on fiber 101 are destined for switching node 100, then, in block 207, all of the optical signals on fiber 101 are switched by the fiber cross-connect 107 to wavelength demultiplexer 111 for processing as described above with respect to FIG. 1.

If, in block 201, it is determined that no optical signals on fiber 101 are destined for switching node 100, then in block 202 it is determined whether one or more optical signals on fiber 101 require equalization, regeneration, and/or wavelength conversion. Monitor 152 of FIG. 1 supplies information regarding equalization and regeneration. Network manager 137 of FIG. 1 supplies information regarding wavelength conversion.

If it is determined in block 202 that one or more optical signals on fiber 101 require equalization, regeneration, and/ or wavelength conversion, then in block 207, all of the optical signals on fiber 101 are switched to wavelength demultiplexer 111 as described above. If, in block 202, it is determined that none of the optical signals on fiber 101 requires equalization, regeneration or wavelength conversion, then in block 204 it is determined whether any of the optical signals on fiber 101 are required to be interchanged with optical signals having the same wavelength on other fibers. Network manager 137 of FIG. 1 supplies this information.

If, in block 204 it is determined that none of the optical signals on fiber 101 is required to be interchanged with an optical signal having the same wavelength on other fibers (i.e., all of the optical signals on fiber 101 are bound for the same output fiber), then the optical signal group on fiber 101 is an express optical signal group and in block 206 all of the optical signals on input fiber 101 are switched to the appropriate output fiber 108 by fiber cross-connect 107 for transmission over fiber 108. In this manner, the express optical signal group is routed directly through switching node 100 without conversion to electrical signals.

If, in block 204 it is determined that some or all of the optical signals on fiber 101 are to be interchanged with signals having the same wavelength on other fibers, then in block 207 all of the optical signals on that fiber 101 are switched to wavelength demultiplexer 111.

Figure 4:
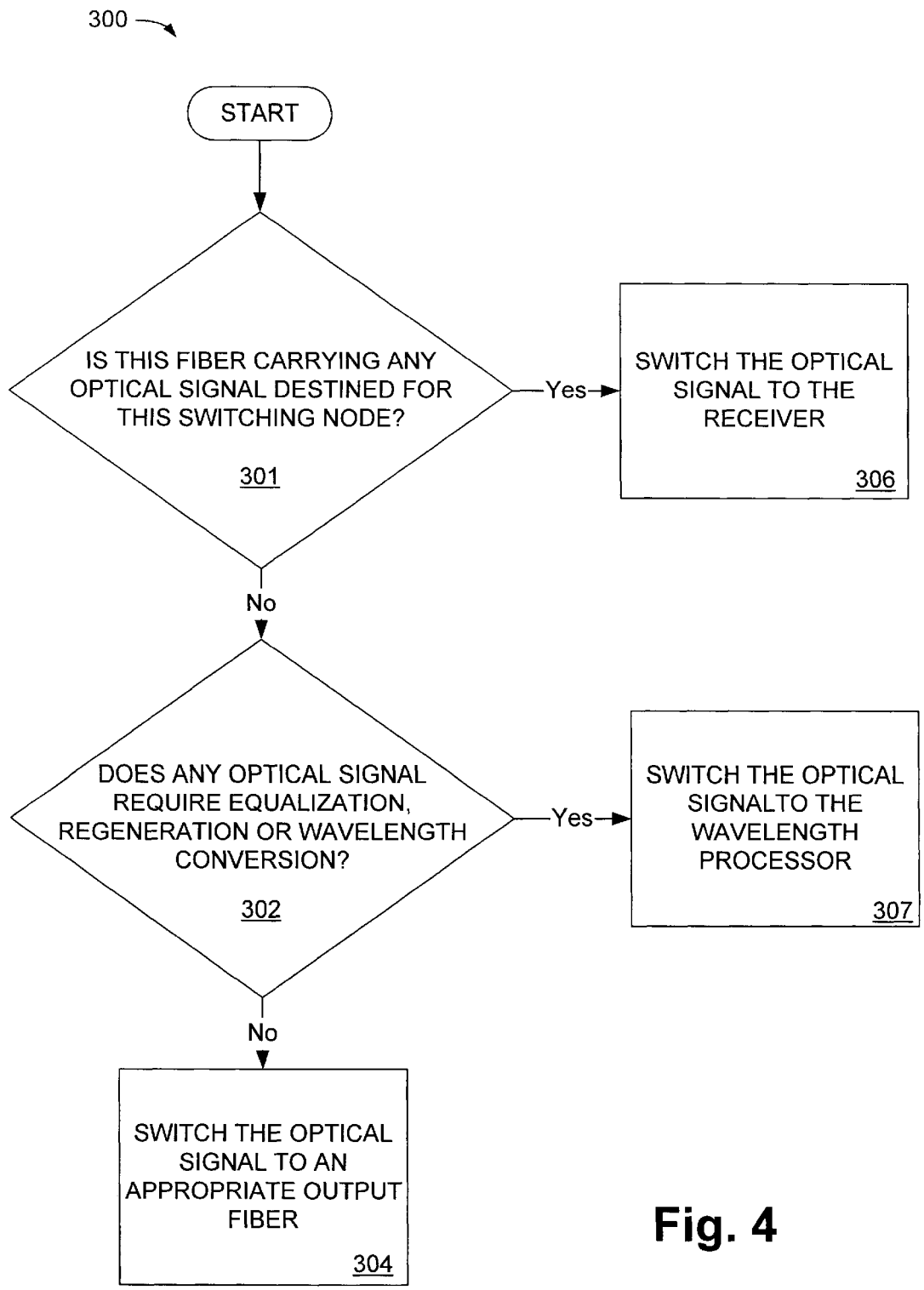
FIG. 4 is a flow chart illustrating the operation of the node controller of FIG. 1 while controlling the wavelength cross-connect of FIG. 1.

FIG. 4 is a flow chart 300 illustrating the operation of the node controller 150, while controlling the wavelength cross-connect 114 of FIG. 1.

In block 301 it is determined whether any of the optical signals output by wavelength demultiplexer 111 is destined for switching node 100 of FIG. 1. Network manager 137 of FIG. 1 supplies this information. If any of the optical signals is destined for switching node 100, then in block 306 the wavelength cross-connect 114 will send the optical signal destined for switching node 100 over connection 163 to the receiver 158 for conversion to an electrical signal and distribution to local entities as described above.

If it is determined, in block 301, that none of the optical signals output by wavelength demultiplexer 111 is destined for switching node 100, in block 302 it is determined whether any of the optical signals output by wavelength demultiplexer 111 requires equalization, regeneration, and/ or wavelength conversion. Monitor 152 of FIG. 1 supplies information regarding equalization and regeneration. Network manager 137 of FIG. 1 supplies information regarding wavelength conversion. If any optical signal requires equalization, regeneration and/or wavelength conversion then, in block 307, that optical signal is switched to the wavelength processor 159 for further processing as described above.

If it is determined in block 302 that none of the optical signals output by wavelength demultiplexer 111 require equalization, regeneration and wavelength conversion (i.e., if the optical signal is an express optical signal), then in block 304, wavelength cross-connect 114 will switch the optical signal to wavelength multiplexer 148 via connection 144, where it is multiplexed and forwarded via connection 146 to an appropriate output fiber through fiber cross-connect 107 and onto fiber 108. In this manner, the node controller 150 determines whether any optical signal destined for an optical switching node other than optical switching node 100 requires equalization, regeneration, and/or wavelength conversion. If no further processing is required on such optical signal, the optical signal is passed directly through optical switching node 100 without conversion to an electrical signal, thus significantly reducing the resources required at optical switching node 100.

It will be apparent to those skilled in the art that many modifications and variations may be made to the preferred embodiments of the invention, as set forth above, without departing substantially from the principles of the invention. All such modifications and variations are intended to be included herein within the scope of the invention, as defined in the claims that follow.

What is claimed is:

1. A method for operating an optical switching node, in which optical signals are received at said optical switching node, the method comprising the steps of:

determining whether any of said optical signals is destined for a different optical switching node;

determining whether any of said optical signals destined for said different switching node requires further processing; and converting to an electrical signal only those of the optical signals destined for said optical switching node and those of the optical signals destined for said different optical switching node and that require further processing.

2. The method of claim 1, wherein said further processing includes processing selected from the group consisting of equalization, regeneration, wavelength conversion and any combination of equalization, regeneration and wavelength conversion.

3. The method of claim 2, further comprising the steps of:

demultiplexing said optical signals destined for said different optical switching node that require any of regeneration, wavelength conversion, equalization and interchange with other signals having the same wavelength.

4. The method of claim 1, further comprising the step of demultiplexing said optical signals destined for said optical switching node.

5. The method of claim 1, further comprising the step of passing directly through said optical switching node without conversion to an electrical signal any optical signal destined for said different optical switching node that requires none of equalization, regeneration and wavelength conversion.

6. The method of claim 1, further comprising the step of passing directly through said optical switching node without demultiplexing any optical signal destined for said different optical switching node that does not require interchange with an optical signal having the same wavelength on a different fiber.

7. An optical switching node in which optical signals are received, the optical switching node comprising:

a fiber cross-connect that receives the optical signals;

a node controller in communication with said fiber cross-connect, said node controller configured to determine whether any of said optical signals are destined for a different optical switching node, said node controller also configured to determine whether any of said optical signals destined for said different switching node require further processing; and means, operating in response to said node controller, for converting from an optical signal to an electrical signal only those signals destined for said optical switching node and those signals destined for said different optical switching node that require further processing.

8. The optical switching node of claim 7, further comprising a wavelength demultiplexer.

9. The optical switching node of claim 7, further comprising a wavelength multiplexer.

10. The optical switching node of claim 7, further comprising a wavelength processor.

11. The optical switching node of claim 10, wherein said wavelength processor further includes a variable optical attenuator.

12. The optical switching node of claim 10, wherein said wavelength processor further includes a regenerator.

13. The optical switching node of claim 10, wherein said wavelength processor further includes a wavelength converter.

* * * * *